US010213847B2

(12) United States Patent
Nakata

(10) Patent No.: US 10,213,847 B2
(45) Date of Patent: Feb. 26, 2019

(54) CHAMFERING TOOL, TOOL SUPPORT SET AND CHAMFERING SYSTEM

(71) Applicant: KREUZ CO., LTD., Kariya-shi, Aichi-ken (JP)

(72) Inventor: Syuichi Nakata, Kariya (JP)

(73) Assignee: KREUZ CO., LTD., Kariya (JP)

( * ) Notice: Subject to any disclaimer, the term of this patent is extended or adjusted under 35 U.S.C. 154(b) by 0 days.

(21) Appl. No.: 15/724,615

(22) Filed: Oct. 4, 2017

(65) Prior Publication Data
US 2018/0264560 A1   Sep. 20, 2018

(30) Foreign Application Priority Data

Mar. 14, 2017   (JP) .................. 2017-047987

(51) Int. Cl.
*B23D 5/00*   (2006.01)
*B23C 3/12*   (2006.01)
(Continued)

(52) U.S. Cl.
CPC .............. *B23C 3/12* (2013.01); *B23B 51/10* (2013.01); *B23D 5/00* (2013.01);
(Continued)

(58) Field of Classification Search
CPC ... B23D 5/00; B23D 5/02; B23D 7/06; B23D 13/00; B23D 13/005; B23D 13/02; B23B 5/16; B23B 51/10; Y10T 409/50246; Y10T 409/5041; Y10T 409/504756; Y10T 409/508036; Y10T 409/509348;
(Continued)

(56) References Cited

U.S. PATENT DOCUMENTS 3,122,947 A * 3/1964 Cogsdill ................. B23B 51/10
                                                              408/199
3,143,923 A * 8/1964 Krzyszczuk ............. B23C 3/18
                                                              408/146
(Continued)

FOREIGN PATENT DOCUMENTS

JP      S59-124023 U      8/1984
JP      H02-190209 A      7/1990
(Continued)

OTHER PUBLICATIONS

Apr. 19, 2017 Office Action issued in Japanese Patent Application No. 2017-047987.
(Continued)

*Primary Examiner* — Daniel Howell
(74) *Attorney, Agent, or Firm* — Oliff PLC

(57) ABSTRACT

A chamfering tool that chamfers an opening edge of a target hole formed in a work, the chamfering tool including a support shaft, a base shaft having the support shaft on a tip end side thereof and being eccentric with respect to the support shaft, and a blade portion having a rake face that is a step surface of a step protrusion portion protruded laterally from the support shaft or that is an end surface of the support shaft. The blade portion including an edge line in a shape of a curve and being bulged to a side away from a center axis of the support shaft, and the edge line being inclined with respect to an axial direction of the support shaft.

20 Claims, 17 Drawing Sheets

(51) Int. Cl.
  *B23B 51/10* (2006.01)
  *B23D 7/06* (2006.01)
  *B23D 13/00* (2006.01)

(52) U.S. Cl.
  CPC ............. *B23C 2210/0428* (2013.01); *B23C 2210/084* (2013.01); *B23C 2210/54* (2013.01); *B23C 2220/16* (2013.01); *B23C 2265/12* (2013.01); *B23C 2265/40* (2013.01); *B23D 7/06* (2013.01); *B23D 13/00* (2013.01); *Y10T 409/50246* (2015.01)

(58) Field of Classification Search
  CPC ... Y10T 409/509512; Y10T 409/50984; B23C 3/12; B23C 2220/16
  See application file for complete search history.

(56) References Cited

U.S. PATENT DOCUMENTS

| | | | | |
|---|---|---|---|---|
| 3,276,294 A * | 10/1966 | Kubicek | ............. | B23B 51/101 408/199 |
| 3,411,386 A * | 11/1968 | Kubicek | ............. | B23B 51/101 408/226 |
| 3,442,162 A * | 5/1969 | Cogsdill | ............. | B23B 5/02 408/156 |
| 3,482,475 A * | 12/1969 | Kuceris | ............. | B23B 29/03485 408/150 |
| 3,753,385 A * | 8/1973 | Zarlengo | ............. | B23C 3/34 29/23.51 |
| 4,032,251 A | 6/1977 | Ribich | | |
| 4,637,775 A * | 1/1987 | Kato | ............. | B23Q 9/0064 414/744.2 |
| 5,312,212 A * | 5/1994 | Naumec | ............. | B23Q 1/48 409/138 |
| 6,019,555 A * | 2/2000 | Sadoski | ............. | B23B 51/101 408/199 |
| 2006/0210364 A1 | 9/2006 | Bellmann et al. | | |
| 2007/0122245 A1 | 5/2007 | Yanagimoto | | |
| 2008/0011142 A1 * | 1/2008 | Cheung | ............. | B26D 1/0006 83/776 |
| 2011/0100178 A1 * | 5/2011 | Tanaka | ............. | B26D 1/0006 83/78 |

FOREIGN PATENT DOCUMENTS

| | | | |
|---|---|---|---|
| JP | H05-162010 A | 6/1993 | |
| JP | H07-024633 A | 1/1995 | |
| JP | 2001-219347 A | 8/2001 | |
| JP | 2007-515303 | 6/2007 | |
| JP | 5550187 B2 | 7/2014 | |
| RU | 2153958 C1 * | 8/2000 | ............. B23D 5/02 |
| WO | 2005065874 | 7/2005 | |
| WO | 2008/004740 A1 | 1/2008 | |

OTHER PUBLICATIONS

Aug. 3, 2018 Taiwanese Office Action issued in Taiwanese Patent Application No. 106139331.

Dec. 6, 2018 Office Action issued in Taiwanese Patent Application No. 106139331.

* cited by examiner

US 10,213,847 B2

CHAMFERING TOOL, TOOL SUPPORT SET AND CHAMFERING SYSTEM

TECHNICAL FIELD

Field of the Invention

The present invention relates to a chamfering tool which chamfers the opening edge of a target hole formed in a work, a tool support set and a chamfering system.

Description of the Related Art

Conventionally, as this type of chamfering tool, a chamfering tool which is used in a state where the chamfering tool is rotated at high speed is known (refer to, for example, Patent Document 1).

RELATED ART DOCUMENTS

Patent Documents

Patent Document 1: Japanese Unexamined Patent Application Publication No. 2001-219347 (FIG. 4 and [0016])

SUMMARY OF THE INVENTION

Problems to be Solved by the Invention

However, with the conventional chamfering tool described above, a rotation drive source for performing the high-speed rotation is also needed to be supported and handled together with the chamfering tool, and thus there arises difficulties in handling.

The present invention has been made in view of the foregoing circumstances, and it is an object of the present invention to provide a chamfering tool which is easily handled, a tool support set and a chamfering system in which a chamfering tool can easily be handled.

Means of Solving the Problems

In order to achieve the above object, a chamfering tool according to the present invention is a chamfering tool which chamfers an opening edge of a target hole formed in a work. The chamfering tool includes a support shaft, a base shaft having the support shaft on a tip end side thereof and being eccentric with respect to the support shaft, and a blade portion having a rake face which is a step surface of a step protrusion portion protruded laterally from the support shaft or which is an end surface of the support shaft. The blade portion includes an edge line in a shape of a curve and being bulged to a side away from a center axis of the support shaft and the edge line is inclined with respect to an axial direction of the support shaft.

DESCRIPTION OF THE EMBODIMENTS

First Embodiment

Figure 1A:
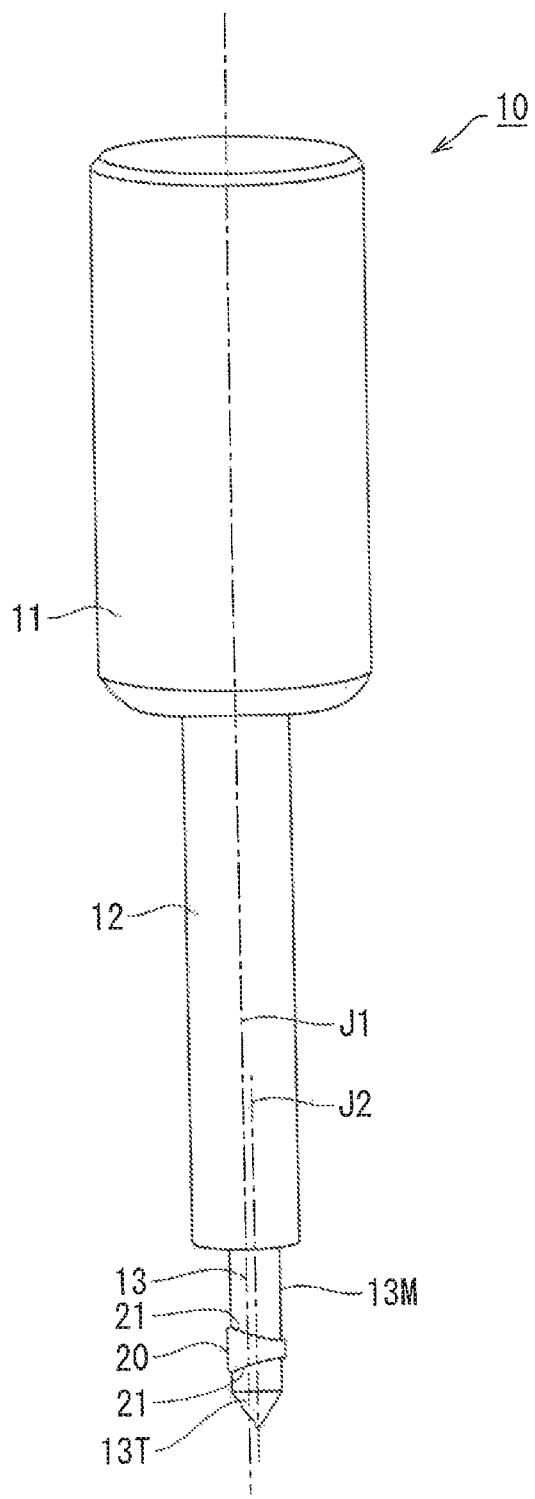
FIG. 1A is a perspective view of a chamfering tool according to a first embodiment of the present invention.

An embodiment of the present invention will be described below with reference to FIG. 1A to FIG. 7. As shown in FIG. 1A, a chamfering tool 10 of the present embodiment has a structure in which an intermediate shaft 12 extends on a coaxial tip end of a base shaft portion 11 (which corresponds to a "base shaft" of the present invention), and in which a support shaft 13 is extended from an eccentric position of a tip end of the intermediate shaft 12. The base shaft portion 11, the intermediate shaft 12 and the support shaft 13 each are formed in a shape of a round bar whose cross section is circular, and diameters thereof are stepwise decreased in the order of the base shaft portion 11, the intermediate shaft 12 and the support shaft 13.

In the following description, the center axis of the base shaft portion 11 and the intermediate shaft 12 is referred to as a "first center axis J1," and the center axis of the support shaft 13 is referred to as a "second center axis J2."

Figure 2:
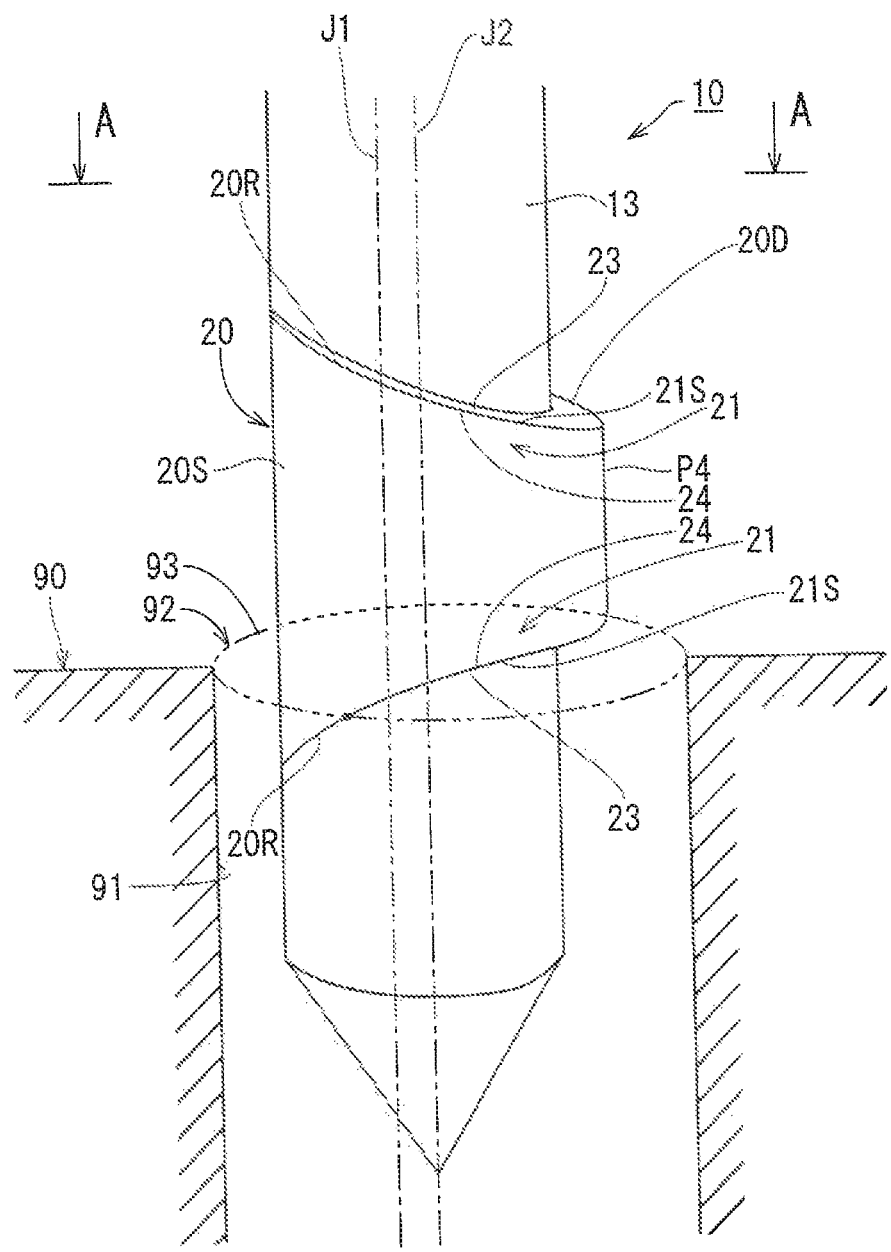
FIG. 2 is a perspective view of a tip end portion of the chamfering tool which is chamfering one end portion of a target hole.

At a tip end portion of the support shaft 13, a tapered portion 13T is provided, and in a position close to the tip end, a step protrusion portion 20 is provided. As shown in FIG. 2, the step protrusion portion 20 is protruded from a side surface 13M of the support shaft 13 in a stepped manner.

Figure 1B:
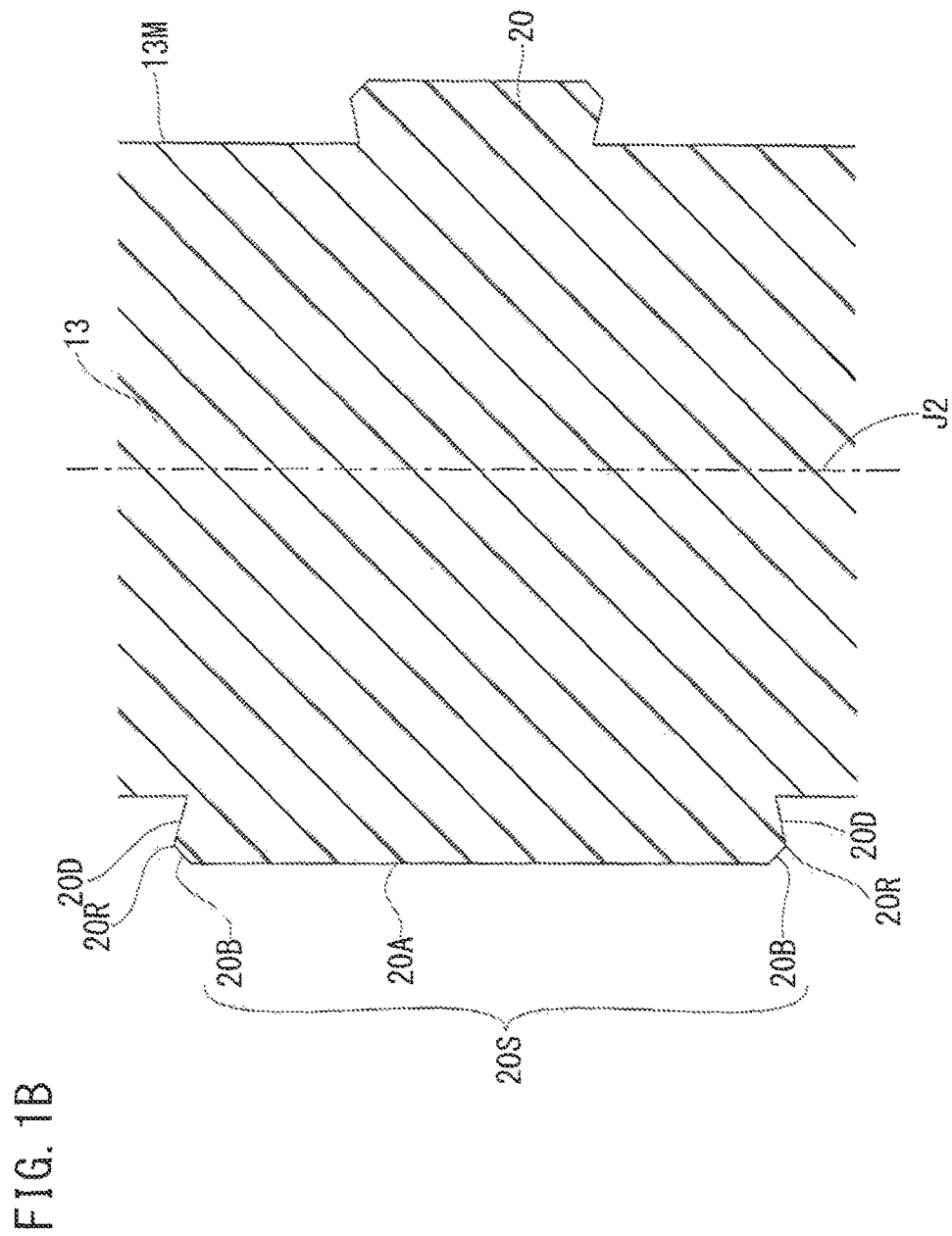
FIG. 1B is an enlarged cross-sectional view of a step protrusion portion.
Figure 1C:
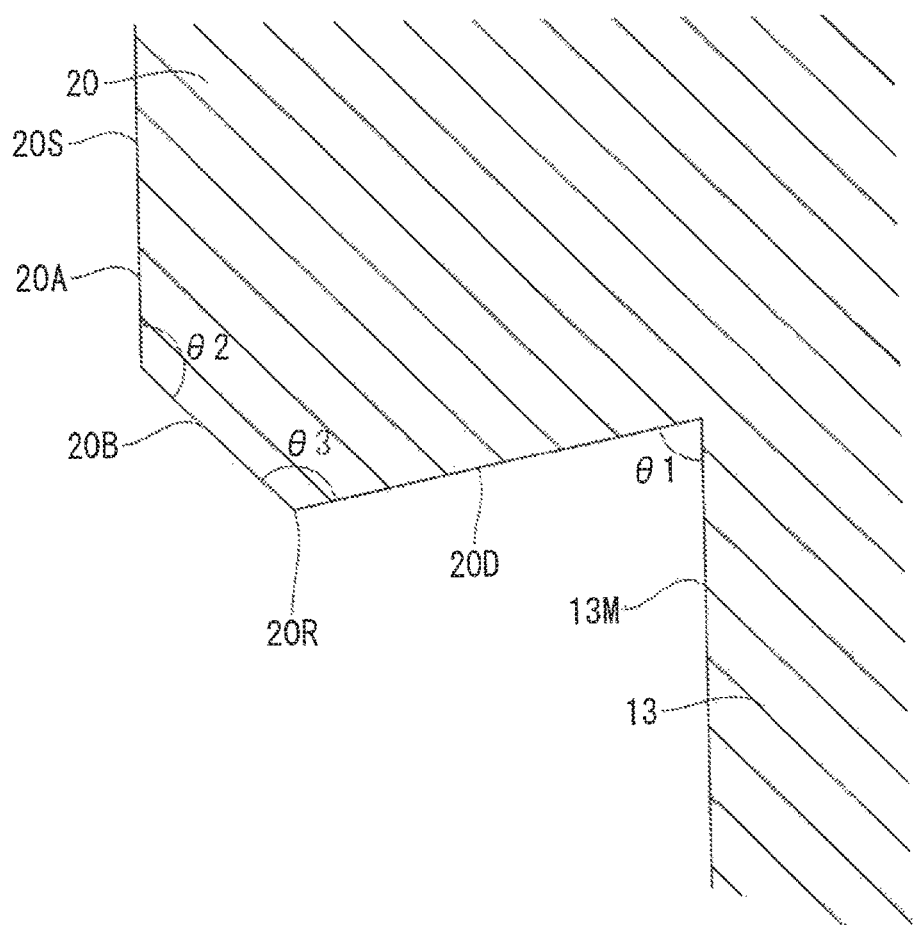
FIG. 1C is an enlarged cross-sectional view of the step protrusion portion.

As shown in FIG. 1B and FIG. 1C, the step protrusion portion 20 includes a side surface 20S and step surfaces 20D, 20D. The intersection angle 81 between the step surfaces 20D, 20D and the side surface 13M of the support shaft 13 is an acute angle, and the step surfaces 20D, 20D are inclined in a concave shape with respect to the second center axis J2 of the support shaft 13. The side surface 20S of the step protrusion portion 20 is constituted with a first side surface 20A and a pair of second side surfaces 20B, 20B. The first side surface 20A is parallel to the axial direction (that is, the axial direction of the second center axis J2) of the support shaft 13. The second side surfaces 20B are inclined so as to approach the support shaft 13 from both upper and lower ends of the first side surface 20A. The intersection angle θ2 between the first side surface 20A and the second side surfaces 20B is an obtuse angle. The second side surface 20B corresponds to an "inclined surface" of the present invention.

The chamfering tool 10 of the present invention includes blade portions 21, 21 (FIG. 2) in which parts of ridge lines 20R, 20R where the step surfaces 20D, 20D and the second side surfaces 20B, 20B of the step protrusion portion 20 intersect each other are edge lines 21S, 21S. The intersection angle θ3 between the step surfaces 20D, 20D, and the second side surfaces 20B, 20B is an obtuse angle.

In the following description, when the blade portions 21, 21 are distinguished from each other, the blade portion 21 of the step protrusion portion 20 on the tip end side of the support shaft 13 is referred to as a first blade portion 21, and the blade portion 21 on the side opposite thereto is referred to as a second blade portion 21. As shown in FIG. 2, the first and second blade portions 21, 21 are symmetric with each other.

Figure 3:
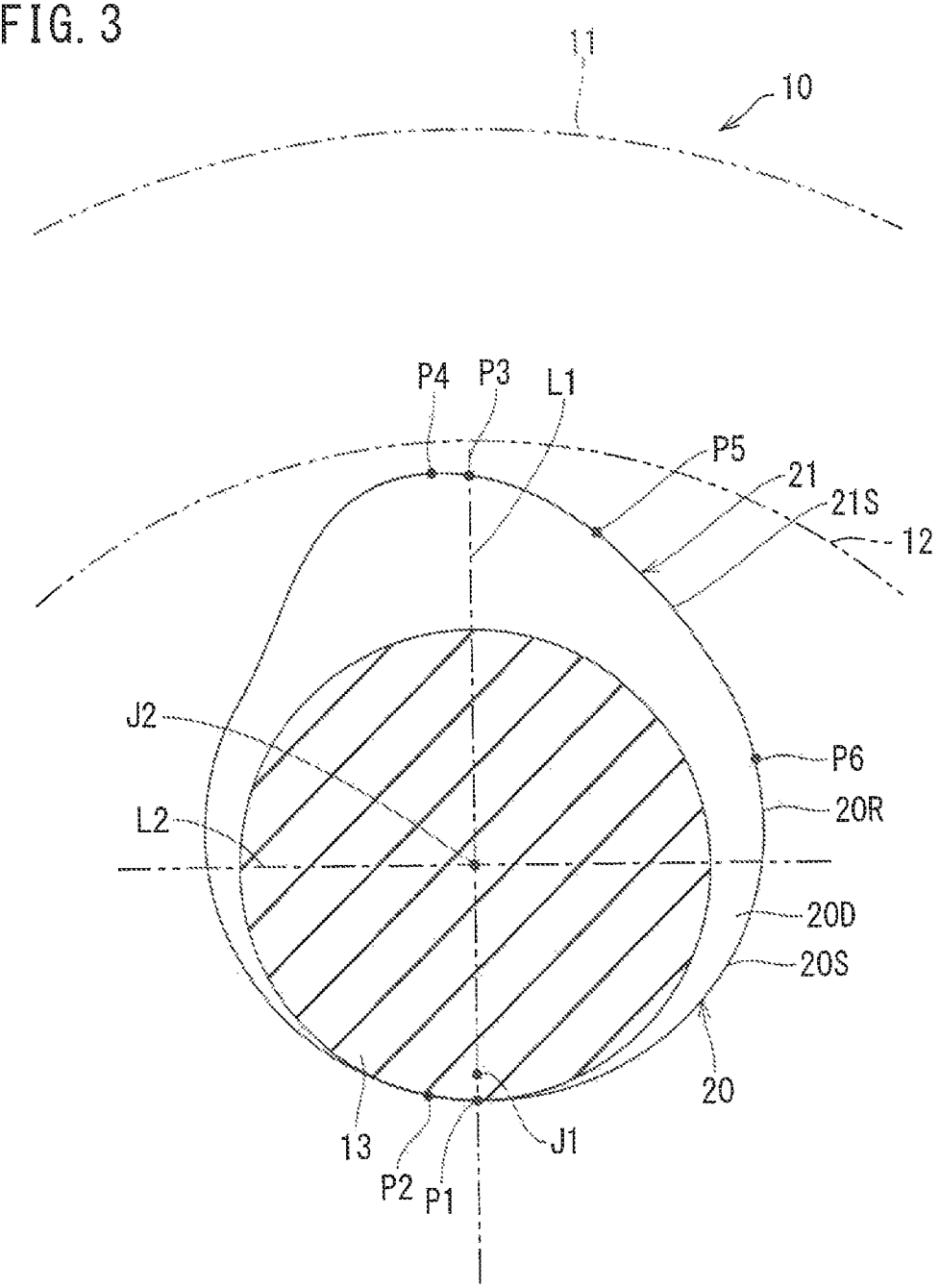
FIG. 3 is a plan cross-sectional view of the chamfering tool taken along the section plane A-A of FIG. 2.

Specifically, as shown in FIG. 3, a line which perpendicularly intersects the first center axis J1 and the second center axis J2 is assumed to be a first reference line L1, and of intersection points between the first reference line L1 and the side surface 20S, the intersection point close to the first center axis J1 is assumed to be a first intersection point P1 and the intersection point far therefrom is assumed to be a second intersection point P3. The distance from the second center axis J2 to the side surface 20S of the step protrusion portion 20 is the shortest in a first position P2 which is slightly displaced from the first reference line L1 to the left side of FIG. 3 with respect to the first intersection point P1 and is the longest in a second position P4 which is slightly displaced from the first reference line L1 to the left side of FIG. 3 with respect to the second intersection point P3. Both the side surface 20S of the step protrusion portion 20 on the right side of FIG. 3 extended from the first position P2 toward the second position P4 and the side surface 20S of the step protrusion portion 20 on the left side of FIG. 3 are bulged outward, and are curved such that the distance from the first center axis J1 is increased as the side surface 20S approaches the second position P4.

Here, in the chamfering tool 10 of the present invention, a part of each of the ridge lines 20R, 20R is a Bernoulli spiral. Specifically, in the ridge lines 20R, 20R, when the ridge line 20R is seen in the axial direction of the second center axis J2, in the right side of FIG. 3, a part from the first position P2 to an intermediate position P5 in front of the second intersection point P3 is a Bernoulli curve. The ridge lines 20R, 20R are extended so as to be inclined with respect to the second center axis J2 (FIG. 1) such that as their positions are positioned closer to the first center axis J1 (that is, as the positions are moved closer to the first position P2), the ridge lines 20R, 20R are separated from each other in the axial direction of the first center axis J1 whereas as their positions are positioned farther from the first center axis J1 (that is, as the positions are moved closer to the second position P4), the ridge lines 20R, 20R approach each other in the axial direction of the first center axis J1. In other words, the parts of the ridge lines 20R, 20R is the Bernoulli spiral in which the Bernoulli curve is inclined with respect to the second center axis J2 and is extended in a spiral shape. A part from the intermediate position P5 to the second position P4 is a curve closer to the second center axis J2 side than the Bernoulli curve, and is continuous with the Bernoulli curve up to the intermediate position P5. The side surface 20S on the right side is smoothly continuous with the side surface 20S on the left side in the second position P4.

Parts of the ridge lines 20R, 20R of the parts on the right side of FIG. 3 between an intermediate position P6 and the second position P4 form the edge lines 21S, 21S of the blade portions 21, 21. As shown in FIG. 2, a part corresponding to the edge line 21S of the step surface 20D is a rake face 23 of each blade portion 21, and a part corresponding to the edge line 21S of the second side surface 20B forming the side surface 20S is a flank face 24 of the blade portion 21. As shown in FIG. 3, the intermediate position P6 is, for example, a position where a second reference line L2 perpendicularly intersecting the first reference line L1 and the second center axis J2 is inclined in a counterclockwise direction in FIG. 3 so as to intersect the ridge line 20R.

Figure 4:
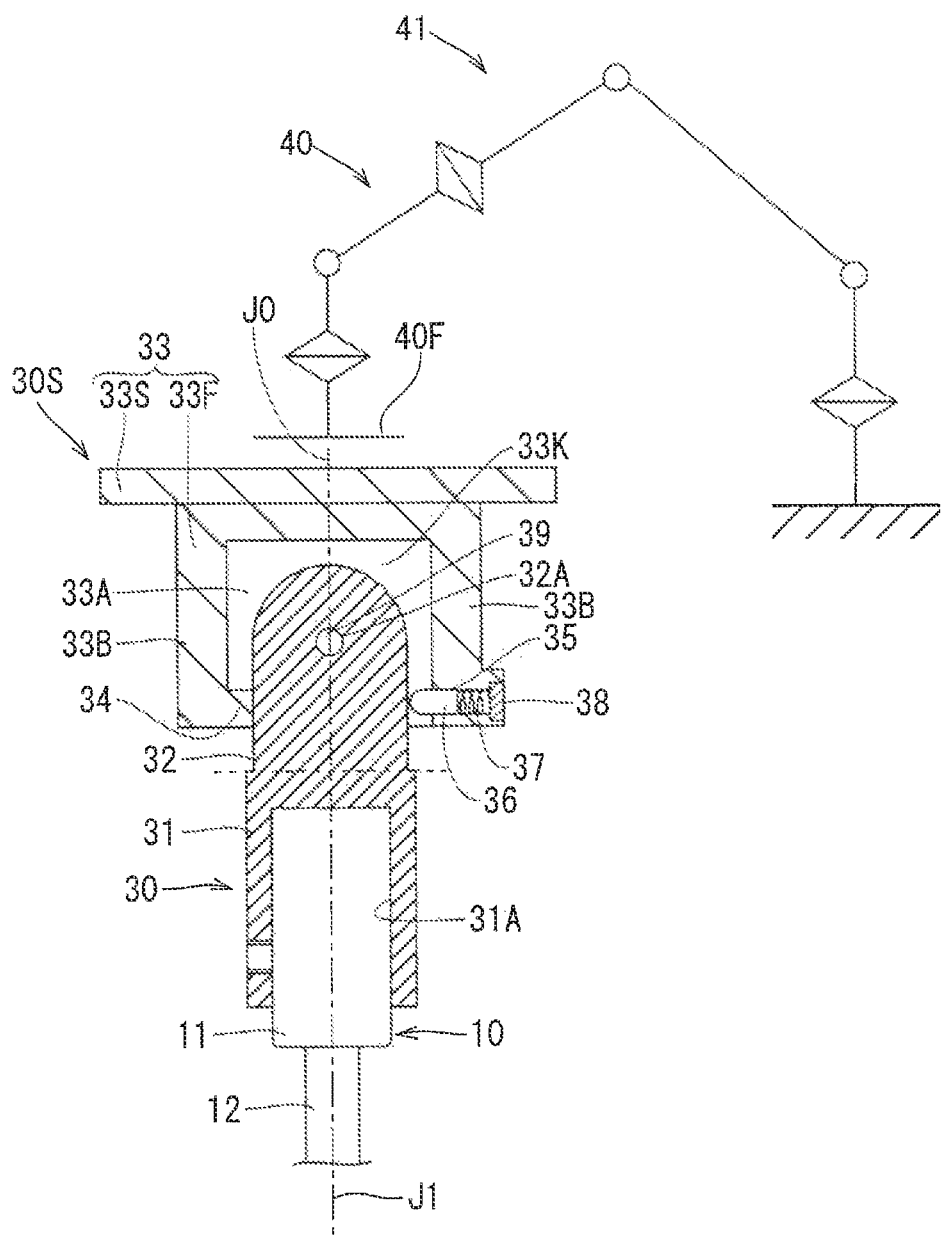
FIG. 4 is a conceptual diagram of a chamfering system.

FIG. 4 conceptually shows part of a chamfering system 41 including the chamfering tool 10. The chamfering system 41 includes a 6-axis vertical articulated robot 40 as a "tool drive mechanism" according to the present invention. A tool support set 30S is attached to a tip end flange 40F of the robot 40. The tool support set 30S includes a holder support portion 33 which is attached to the tip end flange 40F of the robot 40 and a tool holder 30 according to the present invention which is supported by the holder support portion 33 and to which the chamfering tool 10 is fitted and fixed. The holder support portion 33 is rotatably attached to the tip end flange 40F of the robot 40 about a rotation center axis J0, and the tool holder 30 is tiltably attached to the holder support portion 33 with respect to the holder support portion 33.

The tool holder 30 has, for example, a structure in which a coupling protrusion 32 overhangs from an one end surface of a cylindrical member 31 with a bottom at the one end. An interior of the cylindrical member 31 is a tool fitting hole 31A, and the base shaft portion 11 of the chamfering tool 10 is fitted and fixed thereto. A tip end portion of the coupling protrusion 32 has a semicircular shape, and a pin hole 32A is penetrated through a center portion of its semicircular arc.

The holder support portion 33 includes, for example, a support portion main body 33S in the shape of a rectangular parallelepiped in the center of a front surface of a disc-shaped attachment flange 33F. In addition, the holder support portion 33 is attached in a state where a back surface of the attachment flange 33F is overlaid on the tip end flange 40F of the robot 40 and is centered.

In the support portion main body 33S, an internal space 33K is provided which is opened to the side opposite to the attachment flange 33F. In the support portion main body 33S, the distance between a pair of first side walls 33A, 33A (in FIG. 4, one of the first side walls 33A is shown) which are opposed to each other in a direction perpendicular to the plane of FIG. 4 and are sandwiching the internal space 33K is substantially equal to a thickness of the coupling protrusion 32 described above. On the other hand, the distance between second side walls 33B, 33B which are opposed to each other in a left/right direction of FIG. 4 and are sandwiching the internal space 33K is larger than a width of the coupling protrusion 32 described above.

In positions inner than the opening of the internal space 33K in the pair of first side walls 33A, 33A, unillustrated support holes are formed which perpendicularly intersect a center axis of the attachment flange 33F. The coupling protrusion 32 of the tool holder 30 is received in the internal space 33K, and a support pin 39 is inserted through the support holes and the pin hole 32A of the coupling protrusion 32. Thus the tool holder 30 is tiltably supported with respect to the holder support portion 33. The unillustrated support holes formed in each of the first side walls 33A, the pin hole 32A of the coupling protrusion 32 and the support pin 39 form a "holder support mechanism" of the present invention.

On an inner surface of one of the second side walls 33B, in a vicinity of the opening of the internal space 33K, a stopper protrusion portion 34 (which corresponds to a "positioning portion" of the present invention) is formed, the coupling protrusion 32 makes contact with the stopper protrusion portion 34 and thus the tool holder 30 is positioned in an origin position where the center axis of the tool fitting hole 31A coincides with the center axis of the attachment flange 33F (that is, the rotation center axis J0).

Furthermore, in the other second side wall 33B, a plunger support hole 35 is formed in a position opposite to the stopper protrusion portion 34, and a plunger 36 is linearly movably accommodated therein. An outer surface side end portion of the holder support portion 33 in the plunger support hole 35 is blocked by a lid member 38, and a compression coil spring 37 (which corresponds to a "biasing means" of the present invention) is housed between the lid member 38 and the plunger 36. In this way, the plunger 36 is pressed against the coupling protrusion 32, and thus the tool holder 30 is biased so as to be held in the origin position and is allowed to be tilted to the side of the plunger 36.

When the chamfering tool 10 is attached to the tool holder 30, a tilting movement center axis (that is, a center axis of the support pin 39) of the tool holder 30 and the second reference line L2 described above are arranged parallel to each other, and the second center axis J2 is arranged on the side of the stopper protrusion portion 34 with respect to the first center axis J1.

The configuration of the chamfering tool 10, the tool support set 30S and the chamfering system 41 in the present embodiment has been described above. Then, description will be given to a case where the chamfering system 41 is used to chamfer both opening edges of a target hole 91 formed in a work 90 by teaching playback of the robot 40. The target hole 91 penetrates the work 90 in a state where the target hole 91 perpendicularly intersects the outer surface of the work 90. The target hole 91 has just a suitable size to be chamfered in a state where the first center axis J1 of the chamfering tool 10 according to the present embodiment is overlaid on its center axis.

Figure 5A:
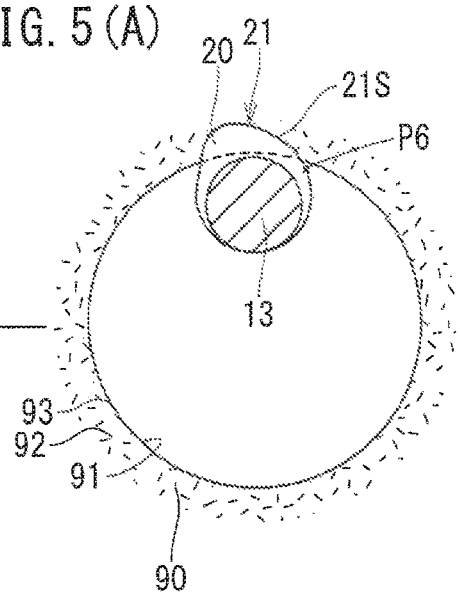
FIG. 5 is an illustrative diagram for illustrating an operation of the chamfering tool.
Figure 5B:
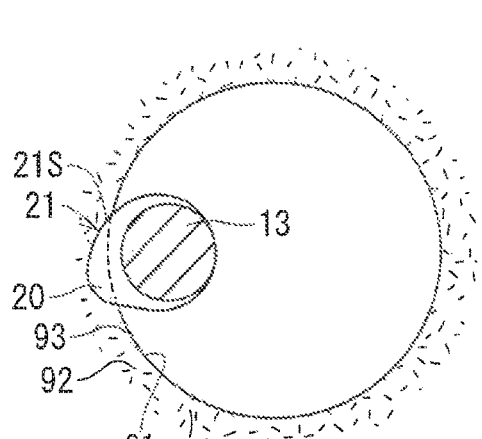
Figure 5C:
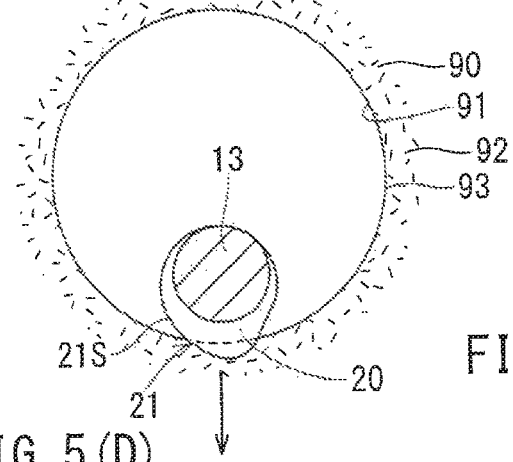
Figure 5D:
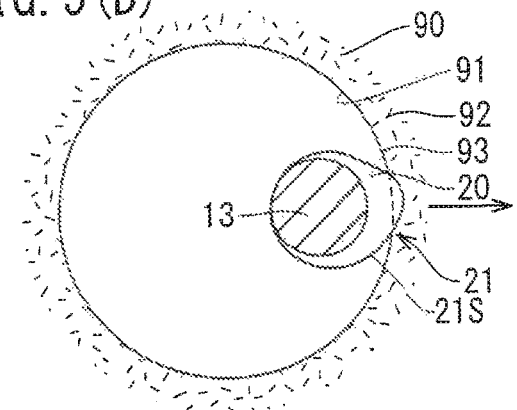
Figure 5E:
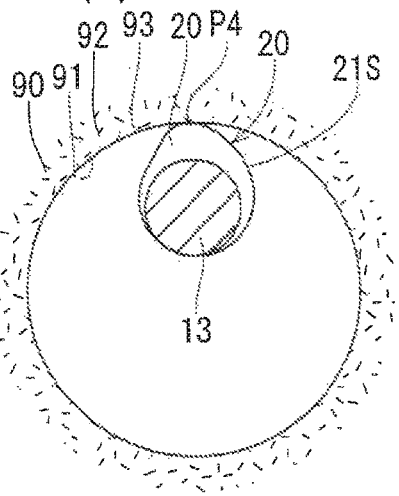

The robot 40 is made to memorize the following operations by teaching. First, in a state where the first center axis J1 of the chamfering tool 10 is overlaid on the center axis of the target hole 91, the chamfering tool 10 is moved forward in the axial direction of the first center axis J1. Then, as shown in FIG. 5(A), an edge 93 on one end side of the target hole 91 makes contact with the vicinity of the intermediate position P6 of the first blade portion 21, and the contact position is used as an initial position. The chamfering tool 10 is rotated by 365 degrees about the first center axis J1 and is moved forward to the target hole 91 while being parallel to the first center axis J1. A direction of rotation of the chamfering tool 10 at that time is set to a direction which extends from the initial contact position where the first blade portion 21 first makes contact with the edge 93 toward the second position P4. An amount of movement in the axial direction of the first center axis J1 is set to a distance in the direction of the first center axis J1 when the movement is performed from the initial contact position to the second position P4 along the edge line 21S of the first blade portion 21.

Figure 7:
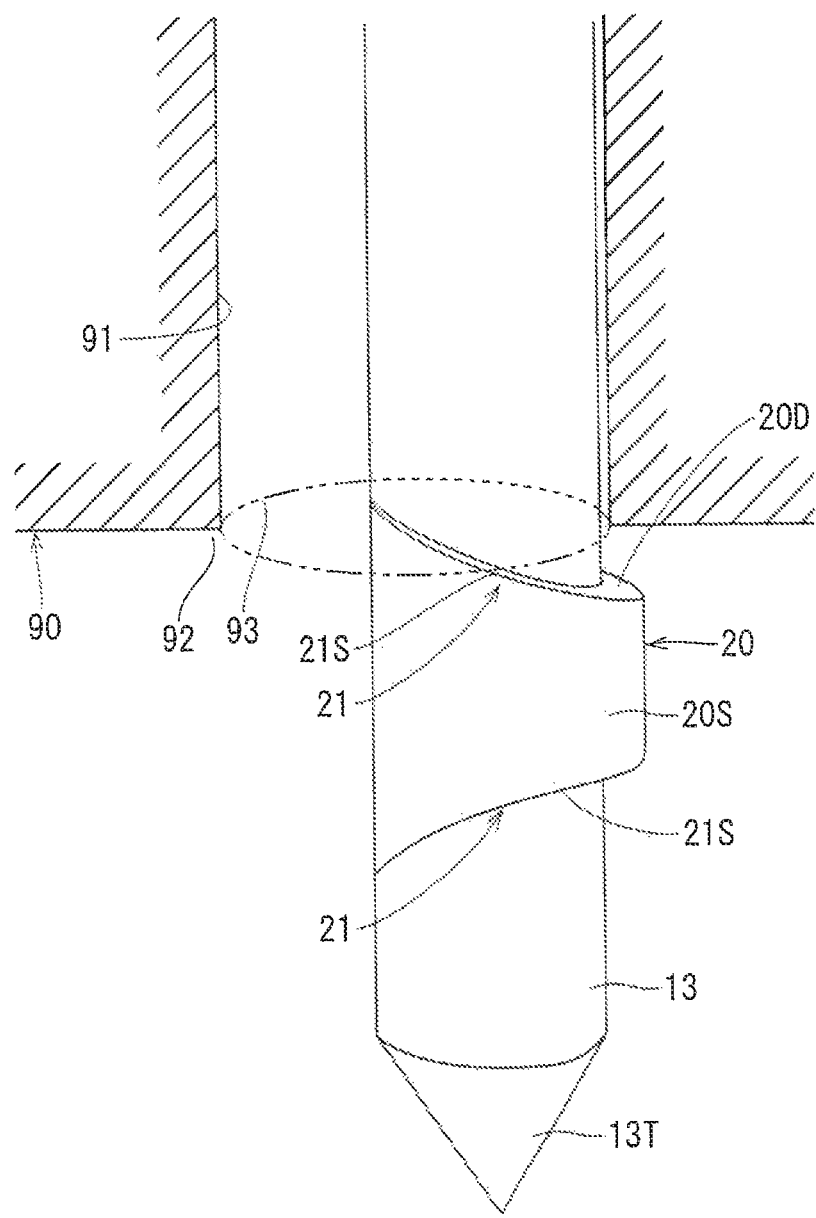
FIG. 7 is a perspective view of the tip end portion of the chamfering tool which chamfers the other end portion of the target hole.

Then, the chamfering tool 10 is moved parallel such that the step protrusion portion 20 is separated from the inner surface of the target hole 91, and as shown in FIG. 7, the chamfering tool 10 is moved forward to a position where the step protrusion portion 20 passes through the target hole 91. Then, in a state where the first center axis J1 of the chamfering tool 10 is overlaid on the center axis of the target hole 91, the chamfering tool 10 is moved backward in the axial direction of the first center axis J1, and thus the second blade portion 21 makes contact with the edge 93 on the other end side of the target hole 91. Thereafter, as with the teaching for the edge 93 on the one end side of the target hole 91, the chamfering tool 10 is moved backward to the side of the target hole 91 parallel to the first center axis J1 while rotating the chamfering tool 10 by 365 degrees about the first center axis J1. Then, the chamfering tool 10 is moved parallel such that the step protrusion portion 20 is separated from the inner surface of the target hole 91, and the chamfering tool 10 is separated from the target hole 91.

When the operation performed by the teaching as described above is played back, the chamfering tool 10 is moved in the axial direction of the first center axis J1, and thus the edge line 21S of the first blade portion 21 makes contact with the edge 93 on the one end side of the target hole 91. Here, the edge line 21S obliquely intersects the edge 93 when viewed both in the axial direction of the first center axis J1 (see FIG. 5(A)) and in a rotation radial direction perpendicular to the first center axis J1 (see FIG. 2).

In this state, the chamfering tool 10 is moved in the axial direction of the first center axis J1, and thus the first blade portion 21 is pressed against the edge 93 of the target hole 91, thereby cutting the edge 93. Here, the first step surface 20D of the first blade portion 21 serves as the rake face 23, the second side surface 20B serves as the flank face 24 and thus the edge 93 is cut.

Then, the flank face 24 of the first blade portion 21 rides over a surface having been cut, and thus the chamfering tool 10 is tiltingly moved so as to be inclined in the rotation radial direction, thereby moving the portion of the edge line 21S to cut into the edge 93 and also the portion of the edge 93 to be cut by the first blade portion 21. Here, the chamfering tool 10 is rotated about the first center axis J1 while being moved in the axial direction of the first center axis J1, and thus the portion of the edge 93 into which the first blade portion 21 is cut is also moved.

Figure 6:
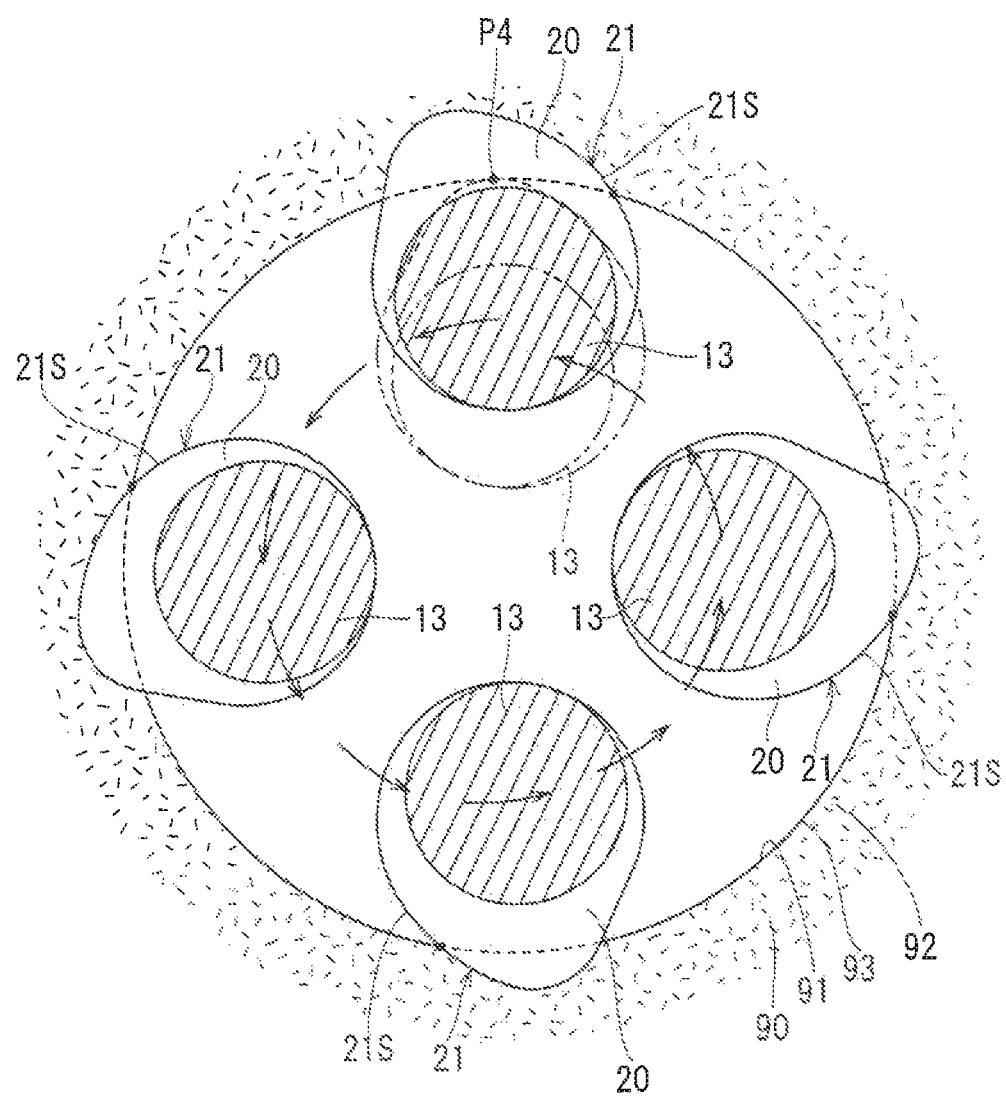
FIG. 6 is an illustrative diagram for illustrating the operation of the chamfering tool.

Then, as shown in FIG. 5(A) to FIG. 5(E), the edge 93 is chamfered over the entire circumference of the target hole 91, and thus the side surface 20S of the step protrusion portion 20 is finally brought into contact with the inner surface of the target hole 91. In FIG. 6, FIG. 5(A) to FIG. 5(E) are superimposedly shown. In FIG. 5 and FIG. 6, the distance between the first center axis J1 and the second center axis J2 shown in FIG. 1 is increased for ease of understanding of the movement of the chamfering tool 10.

Then, as shown in FIG. 7, the chamfering tool 10 is moved forward, the step protrusion portion 20 passes through the target hole 91 and is then moved backward. The edge line 21S of the second blade portion 21 makes contact with the edge 93 on the other end side of the target hole 91. Then, as in the case where the edge 93 on the one end side is chamfered by the first blade portion 21, the edge 93 on the other end side is chamfered by the second blade portion 21, and the chamfering tool 10 is separated from the target hole 91.

As described above, according to the chamfering tool 10, the tool support set 30S and the chamfering system 41 in the present embodiment, it is possible to chamfer the edge 93 of the opening edge 92 of the target hole 91 without use of a drive source for rotating the chamfering tool 10 at high speed. In other words, it is possible to easily handle the chamfering tool 10, and to perform chamfering processing on the edge 93 of the target hole 91 with less energy than a conventional system. Further since the major portion of the edge line 21S has a shape of a Bernoulli spiral, no matter which position of the edge line 21S makes contact with the edge 93 of the target hole 91, the angle of the edge line 21S with respect to the edge 93 of the target hole 91 is made constant in an area of the Bernoulli spiral. In this way, uniformity in the shape of the target hole 91 chamfered in the circumferential direction thereof is achieved.

Furthermore, since the blade portions 21 are provided on both sides of the step protrusion portion 20 in the axial direction of the first center axis J1 in the chamfering tool 10, it is possible both to make the support shaft 13 approach the target hole 91 from the outside of the target hole 91 and thereby chamfer the edge 93 of the opening edge 92 and to pass through the support shaft 13 into the target hole 91 and thereby chamfer the edge 93 of the opening edge 92 of the target hole 91 as described above. Moreover, since the flank face 24 is the inclined surface, the flank face 24 can easily ride over the processed edge 93.

In the chamfering tool 10 of the present embodiment, the tip end portion of the support shaft 13 can easily be inserted into the target hole 91 by guiding of the tapered portion 13T of the support shaft 13. Moreover, since the intersection angle between the rake face 23 and the flank face 24 is an obtuse angle, it is possible to secure the strength of the blade portion 21. Furthermore, since the rake face 23 is inclined in a concave shape, a rake angle is easily secured.

When the chamfering tool 10 is linearly moved in the axial direction of the first center axis J1 in a state where the first center axis J1 in the chamfering tool 10 is overlaid on the center axis of the target hole 91, if the first blade portion 21 does not make contact with the edge 93 of the target hole 91, the teaching is preferably performed as follows. Specifically, the tip end portion of the support shaft 13 is protruded into the target hole 91, thereafter the chamfering tool 10 is moved in the direction of the first reference line L1 and thus the side surface of the support shaft 13 makes contact with the inner circumferential surface of the target hole 91 as shown in the upper right portion of FIG. 5. Then, the chamfering tool 10 is moved in the axial direction of the first center axis J1 such that the first blade portion 21 makes contact with the edge 93 on the one end side of the target hole 91. In this state, the chamfering tool 10 is preferably moved linearly while being rotated about the center axis of the target hole 91 as the rotation center axis. In this way, as in the case described above, it is possible to chamfer the edge 93 of the opening edge 92 of the target hole 91. In such a case, since the structure is provided where the blade portions 21 are provided on the step protrusion portion 20 protruded laterally from the support shaft 13, the side surface 13M of the support shaft 13 makes contact with the inner surface of the target hole 91, and thus easy positioning in a position where the edge line 21S makes contact with the edge 93 is enabled.

Second Embodiment

Figure 8:
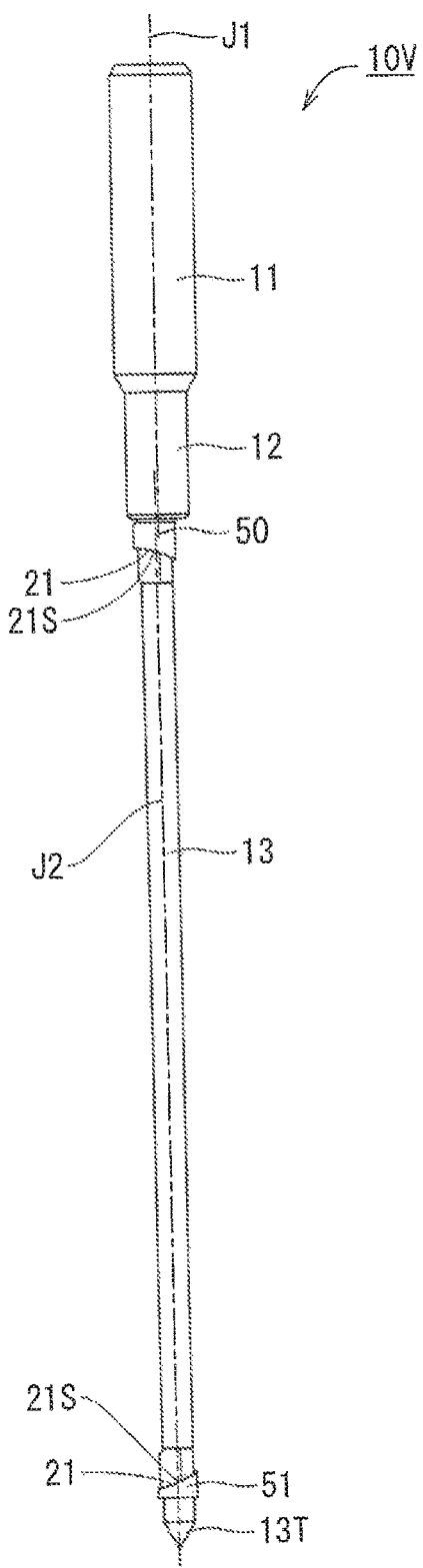
FIG. 8 is a plan view of a chamfering tool of a second embodiment.

In the chamfering tool 10V of the present embodiment, as shown in FIG. 8, as compared with the chamfering tool 10 of the first embodiment described above, the support shaft 13 is elongated, and step protrusion portions 50, 51 are provided in two locations of a base end position of the support shaft 13 and a position close to the tip end thereof. In the positions of the step protrusion portions 50, 51 opposed to each other, the blade portions 21, 21 are provided. In the configuration of the chamfering tool 10V according to the present embodiment as well, it is possible to efficiently chamfer the edge of the opening edge 92 in both end portions of the target hole 91 penetrating the work 90.

Third Embodiment

Figure 9:
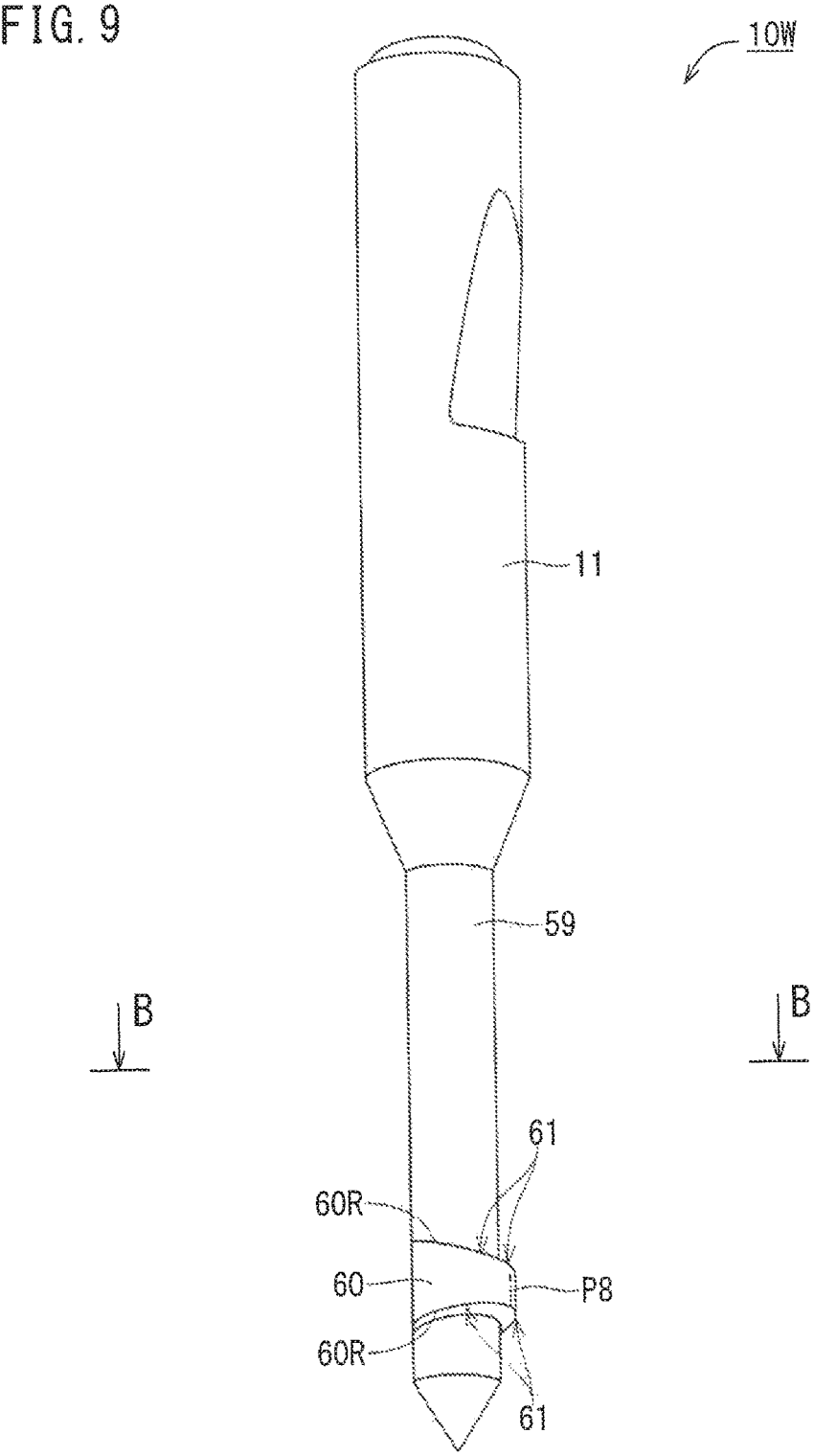
FIG. 9 is a perspective view of a chamfering tool of a third embodiment.
Figure 10:
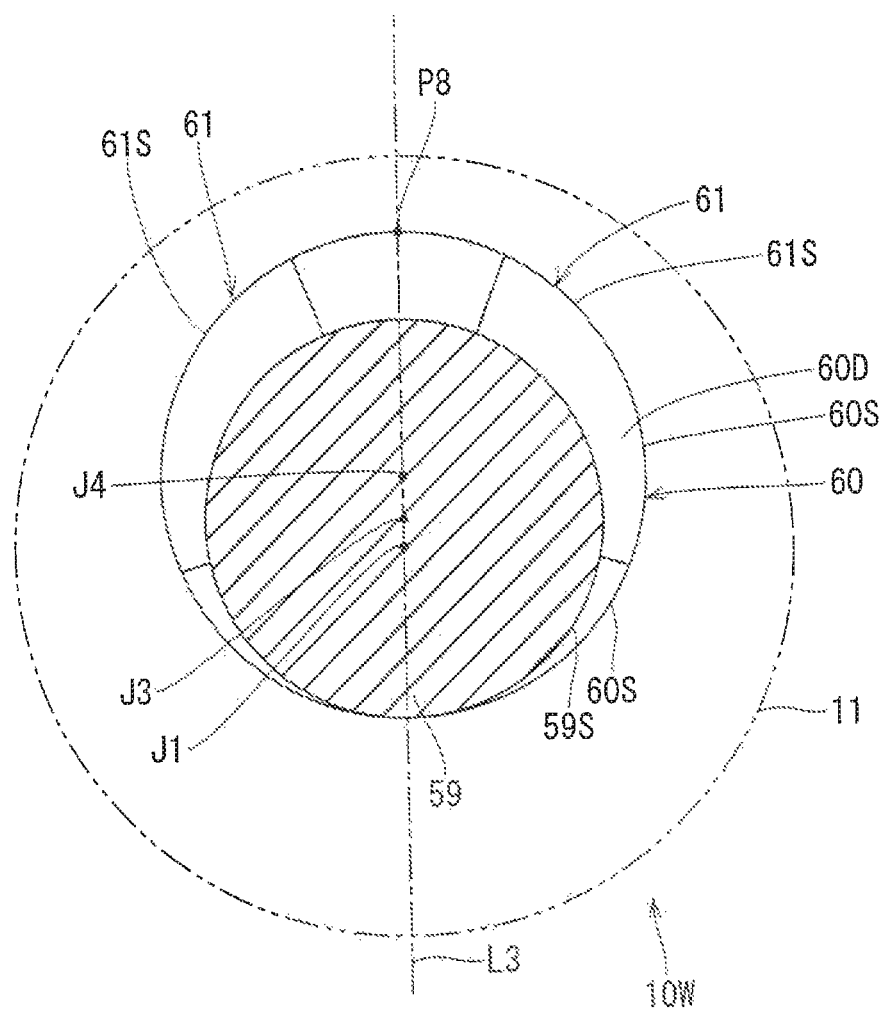
FIG. 10 is a plan cross-sectional view of the chamfering tool taken along the section plane B-B of FIG. 9.

The chamfering tool 10W of the present embodiment is shown in FIG. 9 to FIG. 13. As shown in FIG. 9, the chamfering tool 10W of the present embodiment has a structure in which a support shaft 59 is provided at the tip end of the base shaft portion 11 and in which a step protrusion portion 60 is protruded from a position close to a tip end of the support shaft 59. When viewed in an axial direction of a first center axis J3 as the center axis of the support shaft 59, as shown in FIG. 10, the step protrusion portion 60 has a shape of a circle whose center is a second center axis J4 that is offset with respect to the first center axis J3. A circle which is the side surface 59S of the support shaft 59 is inscribed in the circle as the side surface 60S of the step protrusion portion 60.

Figure 11:
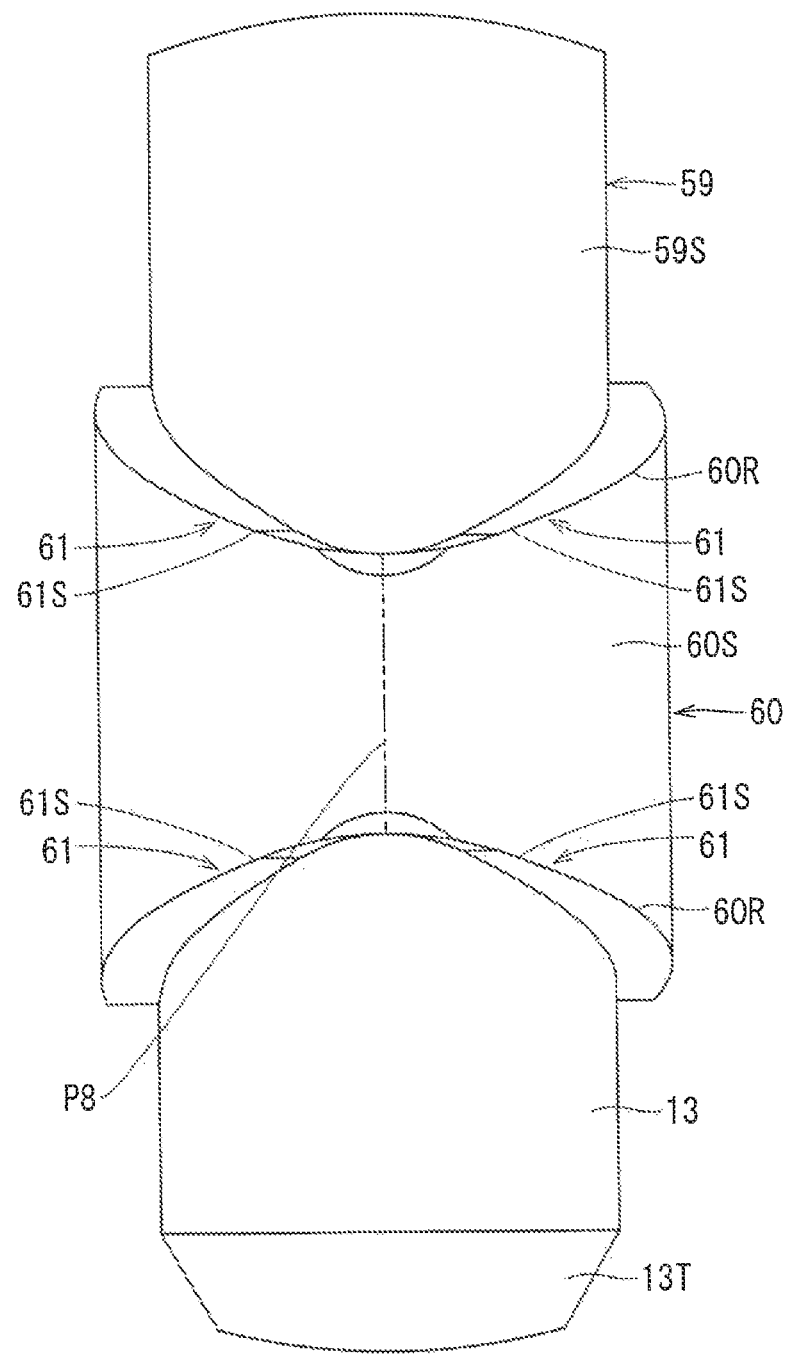
FIG. 11 is a side view of the tip end portion of the chamfering tool.
Figure 12:
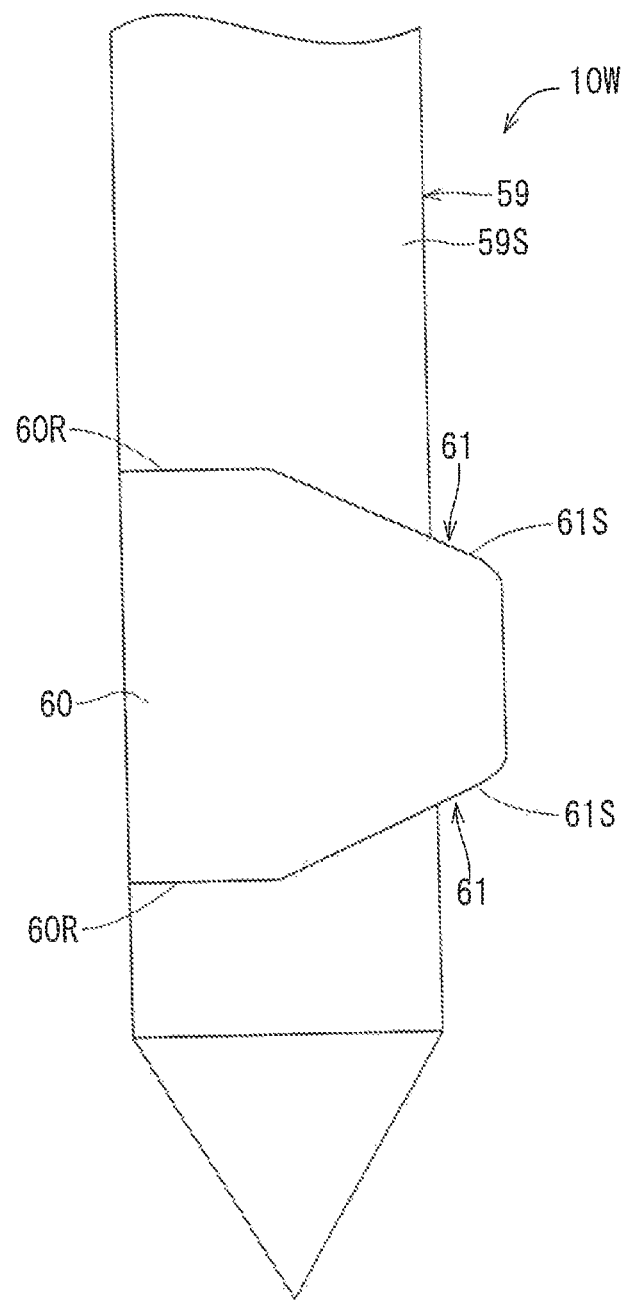
FIG. 12 is a side view of the tip end portion of the chamfering tool.

Here, when a position which is 180 degrees away from the inscribed position on the side surface 59S of the support shaft 59 is assumed to be a first reference position P8, both the ridge lines 60R, 60R of the step protrusion portion 60 are extended away from each other as they are extended away from the first reference position P8 as shown in FIG. 11. The ridge lines 60R, 60R are parallel to each other from positions which are 90 degrees away to right and left from the first reference position P8 as shown in FIG. 12. As shown in FIG. 10, the step protrusion portion 60 is symmetric with respect to a third reference line L3 connecting the inscribed position and the first reference position P8, and as shown in FIG. 11, the step protrusion portion 60 is also symmetric in the axial direction. Four blade portions 61 in which the four spiral curve portions of the ridge lines 60R arranged symmetrically both in the circumferential direction and in the axial direction of the step protrusion portion 60 serve as edge lines 61S, 61S are provided in the step protrusion portion 60.

Figure 13:
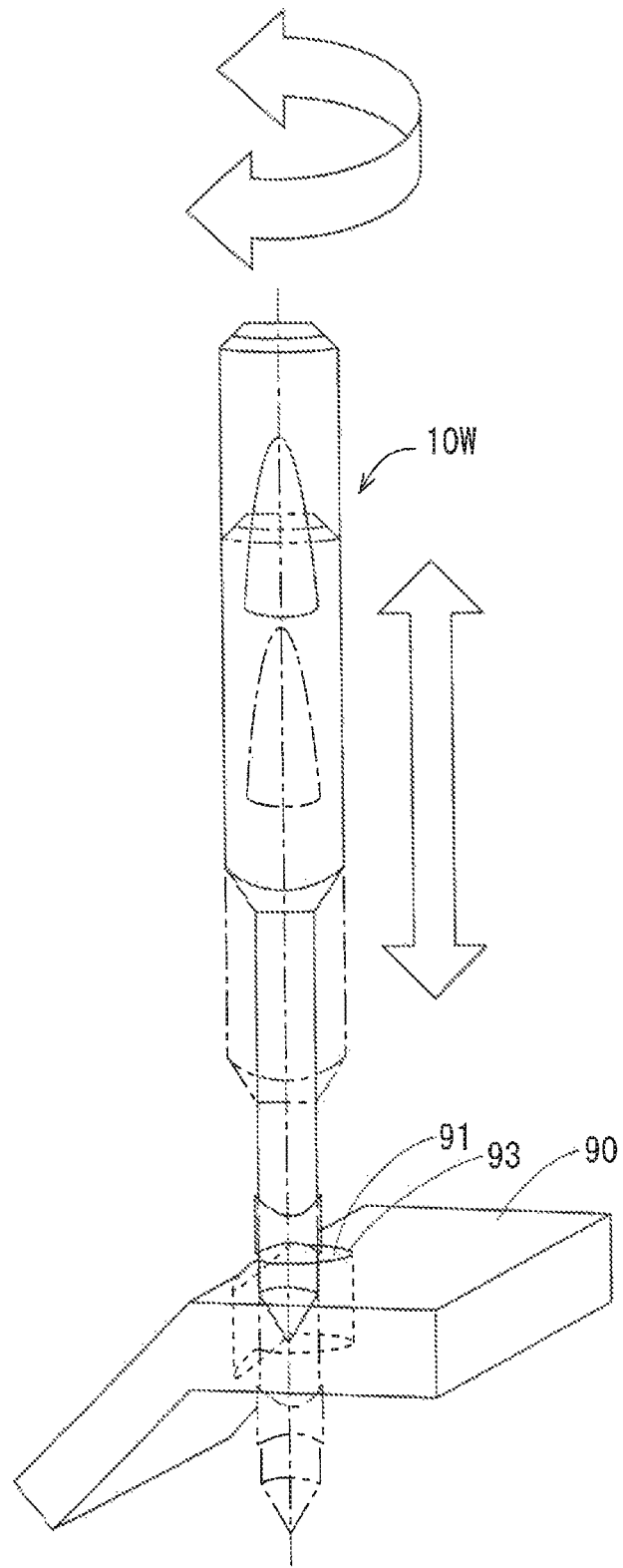
FIG. 13 is a perspective view of a work and the chamfering tool.

With the chamfering tool 10W of the present embodiment, it is possible to perform chamfering by any one of an operation of moving the chamfering tool 10W forward or backward while rotating the chamfering tool 10W clockwise and an operation of moving the chamfering tool 10W forward or backward while counterclockwise. In this way, for example, even when the outer surface of the work 90 is inclined with respect to the axial direction of the target hole 91 or even when as shown in FIG. 13, an opening of the target hole 91 is formed so as to straddle a corner portion of the work 90, the edge 93 of the target hole 91 can easily be chamfered. In such a case, preferably, the operation of making the chamfering tool 10W approach and separate from the opening edge 92 of the target hole 91 in the direction of the rotation center axis is repeated, the operation of rotating the chamfering tool 10W around the rotation center axis while the chamfering tool 10W is separate is performed and thus the edge 93 of the entire circumference of the target hole 91 is chamfered.

Other Embodiments

The present invention is not limited to the embodiments described above, and, for example, embodiments as described below are also included in the technical scope of the present invention, and furthermore, various modifications can be made without departing from the spirit of the present invention and can be implemented.

(1) Although the chamfering tools 10, 10V and 10W of the embodiments described above are arranged such that the first center axis J1 of the base shaft portion 11 is displaced from the second center axis J2 of the support shaft 13, the first center axis J1 and the second center axis J2 may be arranged coaxially. In this case, the second center axis J2 is preferably arranged so as to be eccentric with respect to the rotation center axis J0 of the holder support portion 33, and for example, the center axis of the tool fitting hole 31A may be arranged so as to be eccentric with respect to the center axis of the attachment flange 33F.

(2) As long as the chamfering tools 10, 10V and 10W can be inclined toward the side of the first center axis J1, there is no limitation to the embodiments described above, and another configuration may be adopted. For example, a tool holder disclosed in Japanese Patent No. 5550187 may be used.

(3) Although in the embodiments described above, the tip end (the tapered portion 13T) of the support shaft 13 is formed in a tapered shape in which the support shaft 13 is constricted as the support shaft 13 is extended to the tip end side, the tip end may be formed in a semicircular shape or may be formed in a cylindrical shape whose diameter is equal to that of the support shaft 13.

Figure 14A:
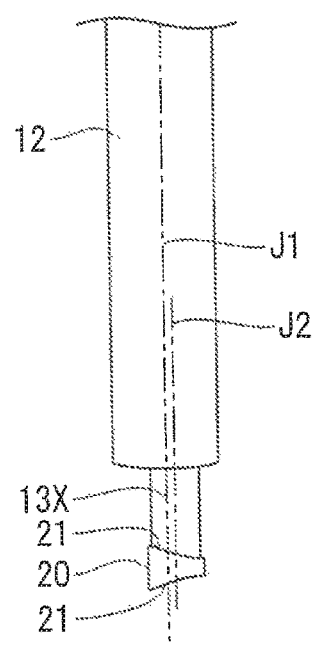
FIG. 14 is a plan view of a tip end portion of a chamfering tool according to a variation.
Figure 14B:
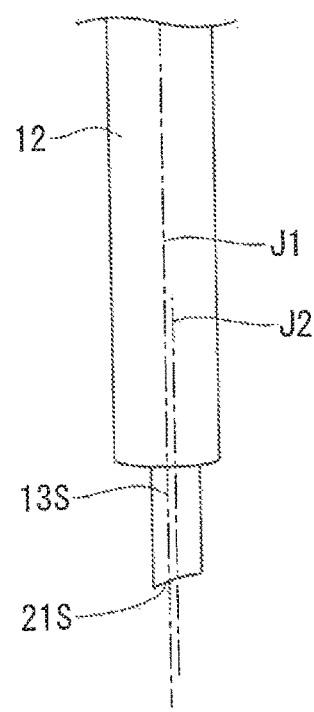

(4) As shown in FIG. 14(A), a configuration may be adopted in which the tapered portion 13T is not provided at the tip end of a support shaft 13X. As shown in FIG. 14(B), a configuration may be adopted in which the step protrusion portion 20 is not provided on a support shaft 13S and in which the edge line 21S may be provided on the tip end of the support shaft 13S.

Figure 15:
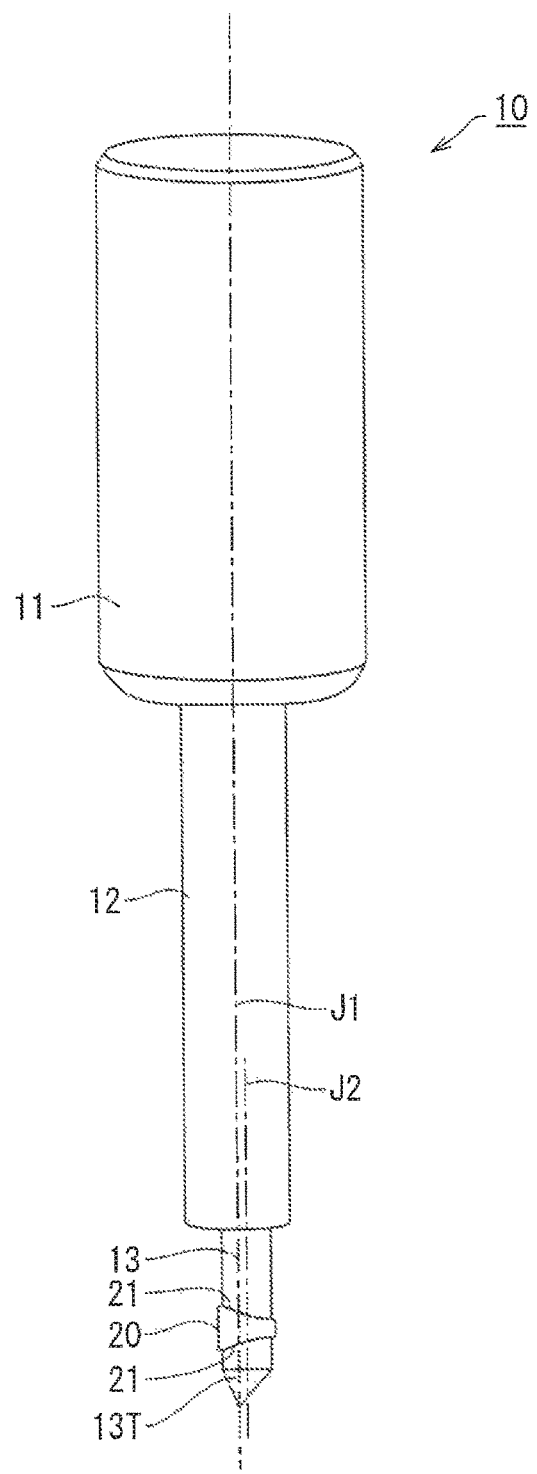
FIG. 15 is a plan view of the tip end portion of the chamfering tool according to a variation.

(5) Although in the embodiments described above, the tapered portion 13T is formed in the shape of a cone whose tip end is the center of the support shaft 13, as shown in FIG. 15, the tip end of the tapered portion 13T may be formed in the shape of an eccentric cone whose tip end is the center of the base shaft portion 11.

(6) Although in the embodiments described above, the intersection angle between the second side surface 20B of the step protrusion portion 20 and the step surfaces 20D, 20D of the step protrusion portion 20 is an obtuse angle, it may be an acute angle.

(7) Although in the embodiments described above, the side surface 20S of the step protrusion portion 20 is formed with the first side surface 20A and the second side surfaces 20B, 20B, the side surface 20S may not include the second side surfaces 20B, 20B. Here, a ridge line in which the first side surface 20A and the step surface 20D intersect each other serves as the edge line. At that time, the intersection angle between the first side surface 20A of the step protrusion portion 20 and the step surface 20D may be either an obtuse angle or an acute angle.

(8) Although in the embodiments described above, as shown in FIG. 1B, the first side surface 20A of the step protrusion portion 20 is extended parallel to the second center axis of the support shaft 13, the first side surface 20A of the step protrusion portion 20 may be extended so as to be inclined or curved with respect to the second center axis J2. Preferably, when the first side surface 20A is extended so as to be inclined or curved, as the first side surface 20A approaches the end portion of the step protrusion portion 20 in the axial direction of the second center axis J2, the first side surface 20A approaches the support shaft 13.

(9) Although in the embodiments described above, the case where the shape of the edge line 21S is a Bernoulli spiral is illustrated, the shape of the edge line 21S may be, for example, an arc spiral, an Archimedean spiral or an involute spiral.

DESCRIPTION OF THE REFERENCE NUMERALS 10, 10V, 10W Chamfering tool
13, 59 Support shaft
13T Tapered portion
20, 50, 51, 60 Step protrusion portion
20R, 60R Ridge line
21, 61 Blade portion
21S, 61S Edge line
23 Rake face
24 Flank face
30 Tool holder
33 Holder support portion
34 Stopper protrusion portion (positioning portion)
37 Compression coil spring (biasing means)
40 Robot (tool drive mechanism)
41 Chamfering system
90 Work
91 Target hole
92 Opening edge
93 Edge

What is claimed is:

1. A chamfering tool which chamfers an opening edge of a target hole formed in a work, the chamfering tool comprising:
   a support shaft;
   a base shaft having the support shaft on a tip end side thereof and being eccentric with respect to the support shaft; and
   a blade portion having a rake face which is a step surface of a step protrusion portion protruded laterally from the support shaft or which is an end surface of the support shaft,
   wherein the blade portion includes an edge line in a shape of a curve and being bulged to a side away from a center axis of the support shaft, and
   wherein the edge line is inclined with respect to an axial direction of the support shaft.

2. The chamfering tool according to claim 1, wherein the edge line is a Bernoulli spiral.

3. The chamfering tool according to claim 1, wherein the edge line is an arc spiral whose radius is constant.

4. The chamfering tool according to claim 1, wherein the edge line is an Archimedean spiral.

5. The chamfering tool according to claim 1, wherein the blade portions are provided on both sides of the step protrusion portion in the axial direction of the support shaft.

6. The chamfering tool according to claim 1, wherein the step protrusion portions are arranged in two places separate from each other in the axial direction of the support shaft, and
   wherein the blade portions are arranged in positions of a pair of the step protrusion portions so as to be opposed to each other.

7. The chamfering tool according to claim 1, wherein the blade portions are arranged in two positions of the step protrusion portion in a circumferential direction of the support shaft.

8. The chamfering tool according to claim 1,
wherein the step protrusion portion is arranged partway in the axial direction of the support shaft, and
wherein a tapered portion is provided at a tip end of the support shaft.

9. The chamfering tool according to claim 1,
wherein an inclined surface which makes a side surface of the support shaft or a side surface of the step protrusion portion communicate with the rake face is provided, and
wherein the inclined surface is used as a flank face of the blade portion.

10. The chamfering tool according to claim 1,
wherein the blade portion includes the flank face whose intersection angle with the rake face is an obtuse angle.

11. The chamfering tool according to claim 1,
wherein the rake face is inclined in a concave shape.

12. A tool support set comprising:
a holder support portion being rotatably supported;
a tool holder holding the chamfering tool according to claim 1 and being supported by the holder support portion such that the center axis of the support shaft is offset with respect to a rotation center axis of the holder support portion;
a holder support mechanism tiltably or movably supporting the tool holder with respect to the holder support portion;
a biasing means biasing the tool holder to a side where the center axis of the support shaft is moved away from the rotation center axis of the holder support portion; and
a positioning portion provided in the holder support portion, making contact with the tool holder by biasing the biasing means, and positioning the tool holder in an origin position where the rotation center axis of the holder support portion is parallel to the center axis of the support shaft.

13. The tool support set comprising:
a holder support portion being rotatably supported;
a tool holder holding the chamfering tool according to claim 2 and being supported by the holder support portion such that the center axis of the support shaft is offset with respect to a rotation center axis of the holder support portion;
a holder support mechanism tiltably or movably supporting the tool holder with respect to the holder support portion;
a biasing means biasing the tool holder to a side where the center axis of the support shaft is moved away from the rotation center axis of the holder support portion; and
a positioning portion provided in the holder support portion, making contact with the tool holder by biasing the biasing means, and positioning the tool holder in an origin position where the rotation center axis of the holder support portion is parallel to the center axis of the support shaft.

14. The tool support set comprising:
a holder support portion being rotatably supported;
a tool holder holding the chamfering tool according to claim 5 and being supported by the holder support portion such that the center axis of the support shaft is offset with respect to a rotation center axis of the holder support portion;
a holder support mechanism tiltably or movably supporting the tool holder with respect to the holder support portion;
a biasing means biasing the tool holder to a side where the center axis of the support shaft is moved away from the rotation center axis of the holder support portion; and
a positioning portion provided in the holder support portion, making contact with the tool holder by biasing the biasing means, and positioning the tool holder in an origin position where the rotation center axis of the holder support portion is parallel to the center axis of the support shaft.

15. The tool support set comprising:
a holder support portion being rotatably supported;
a tool holder holding the chamfering tool according to claim 6 and being supported by the holder support portion such that the center axis of the support shaft is offset with respect to a rotation center axis of the holder support portion;
a holder support mechanism tiltably or movably supporting the tool holder with respect to the holder support portion;
a biasing means biasing the tool holder to a side where the center axis of the support shaft is moved away from the rotation center axis of the holder support portion; and
a positioning portion provided in the holder support portion, making contact with the tool holder by biasing the biasing means, and positioning the tool holder in an origin position where the rotation center axis of the holder support portion is parallel to the center axis of the support shaft.

16. The tool support set comprising:
a holder support portion being rotatably supported;
a tool holder holding the chamfering tool according to claim 7 and being supported by the holder support portion such that the center axis of the support shaft is offset with respect to a rotation center axis of the holder support portion;
a holder support mechanism tiltably or movably supporting the tool holder with respect to the holder support portion;
a biasing means biasing the tool holder to a side where the center axis of the support shaft is moved away from the rotation center axis of the holder support portion; and
a positioning portion provided in the holder support portion, making contact with the tool holder by biasing the biasing means, and positioning the tool holder in an origin position where the rotation center axis of the holder support portion is parallel to the center axis of the support shaft.

17. A chamfering system comprising:
a tool drive mechanism rotatably supporting the holder support portion of the tool support set according to claim 12, making the rotation center axis thereof coincide with a center axis of the target hole, and linearly moving the chamfering tool in a direction of the rotation center axis.

18. The chamfering system comprising:
a tool drive mechanism rotatably supporting the holder support portion of the tool support set according to claim 14, making the rotation center axis thereof coincide with a center axis of the target hole, and linearly moving the chamfering tool in a direction of the rotation center axis.

19. The chamfering system comprising:
a tool drive mechanism rotatably supporting the holder support portion of the tool support set according to claim 15, making the rotation center axis thereof coincide with a center axis of the target hole, and linearly moving the chamfering tool in a direction of the rotation center axis.

20. The chamfering system comprising:

a tool drive mechanism rotatably supporting the holder support portion of the tool support set according to claim 16, making the rotation center axis thereof coincide with a center axis of the target hole, and linearly moving the chamfering tool in a direction of the rotation center axis.

\* \* \* \* \*